Jan. 5, 1954 E. G. ROEHM 2,665,126
CRANKSHAFT PIN HARDENING MACHINE
Filed May 22, 1953 9 Sheets-Sheet 1

INVENTOR.
ERWIN G. ROEHM
BY
ATTORNEYS.

Jan. 5, 1954  E. G. ROEHM  2,665,126
CRANKSHAFT PIN HARDENING MACHINE
Filed May 22, 1953  9 Sheets-Sheet 2

INVENTOR.
ERWIN G. ROEHM
BY H. K. Parsons & C. W. Wright
ATTORNEYS.

Jan. 5, 1954 E. G. ROEHM 2,665,126
CRANKSHAFT PIN HARDENING MACHINE
Filed May 22, 1953 9 Sheets-Sheet 3

INVENTOR.
ERWIN G. ROEHM
BY H. K. Parsons & C. W. Wright
ATTORNEYS.

Jan. 5, 1954 E. G. ROEHM 2,665,126
CRANKSHAFT PIN HARDENING MACHINE
Filed May 22, 1953 9 Sheets-Sheet 4

INVENTOR.
ERWIN G. ROEHM
BY N. X. Parsons & C. W. Wright.
ATTORNEYS.

Jan. 5, 1954 E. G. ROEHM 2,665,126
CRANKSHAFT PIN HARDENING MACHINE
Filed May 22, 1953 9 Sheets-Sheet 5

INVENTOR.
ERWIN G. ROEHM
BY N. X. Parsons & L. W. Wright
ATTORNEYS.

Jan. 5, 1954   E. G. ROEHM   2,665,126
CRANKSHAFT PIN HARDENING MACHINE
Filed May 22, 1953   9 Sheets-Sheet 6

INVENTOR.
ERWIN G. ROEHM
BY H. K. Parsons & L. W. Wright
ATTORNEYS.

Jan. 5, 1954  E. G. ROEHM  2,665,126
CRANKSHAFT PIN HARDENING MACHINE
Filed May 22, 1953  9 Sheets-Sheet 8

Fig. 8

INVENTOR.
ERWIN G. ROEHM
BY
H. K. Parsons & C. W. Wright
ATTORNEYS.

Fig. 15

Patented Jan. 5, 1954

2,665,126

UNITED STATES PATENT OFFICE 2,665,126

CRANKSHAFT PIN HARDENING MACHINE

Erwin G. Roehm, Norwood, Ohio, assignor to The Cincinnati Milling Machine Co., Cincinnati, Ohio, a corporation of Ohio Application May 22, 1953, Serial No. 356,687

16 Claims. (Cl. 266—4)

This invention relates to flame hardening machines and more particularly to an improved machine for heat treating crankshafts and the like so that all the crank pins and bearing pins of a cranshaft can be uniformly heat treated simultaneously in one operation.

In this invention, each individual pin is placed in the jaws of a bifurcated burner with the necessary clearance to establish a heating flame between the pin and the opposing jaws of the burner, and the shaft is rotated to effect relative rotary movement of the pin within the jaws of the burner to obtain uniform heating of the periphery of the pin. In the case of the crankpins which move in orbital paths, the burner, of course, is synchronized to move in the same path, but it is a bodily movement and not a rotary movement of the burner, whereby the open end of the jaw is maintained facing in the same direction at all times during movement. By synchronizing the rotation of the shaft with the orbital movement of the burners, it is possible to insert and withdraw the pins as respects their respective burners during orbital movement of both, thus eliminating the necessity for starting and stopping movement of the burners for each shaft to be treated. It should be made clear that the bearing pins and their burners have no orbital movement because they are at the center of rotation of the shaft.

One of the objects of this invention, therefore, is to provide a new and improved production hardening machine in which heavy crankshafts may have all of their pins automatically heat treated simultaneously to a predetermined temperature and thereafter quenched in a complete automatic cycle.

Another object of this invention is to provide an automatic crankshaft heat treating machine with an improved burner mechanism which is arranged to automatically cause the individual burners to follow the crankpins around their individual orbits during rotation of the shaft to thus obtain uniform heating of the pins.

A further object of this invention is to provide an automatic machine for the purposes disclosed which is efficiently arranged for processing work through the machine from a loading station at one end to a discharge station at the rear end of the machine in that a slidable indexible fixture is provided over a quench tank for receiving work on one side at the loading station for indexing to a heating station on the other side of the fixture and movement to a heating mechanism at the rear of the machine to effect heating of the work, providing means on the slide operative on its return to move the heated work from the indexible fixture into the quench tank, from which it is removed to the discharge station at the rear of the machine.

Another object of this invention is to provide an automatic cyclic operating flame hardening machine for heat treating pins of heavy crankshafts which will move the shafts into heating position in conjunction with eccentric moving burners, rotate the shaft to move the pins in synchronism with the burners to heat the pins withdraw the shaft from the burners automatically under temperature control and bodily lower the shaft into a quench tank as soon as withdrawn to effect quenching before the shaft cools.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims without departing from or exceeding the spirit of the invention.

Referring to the drawings in which like reference numerals indicate like or similar parts.

Figures 1, 12:
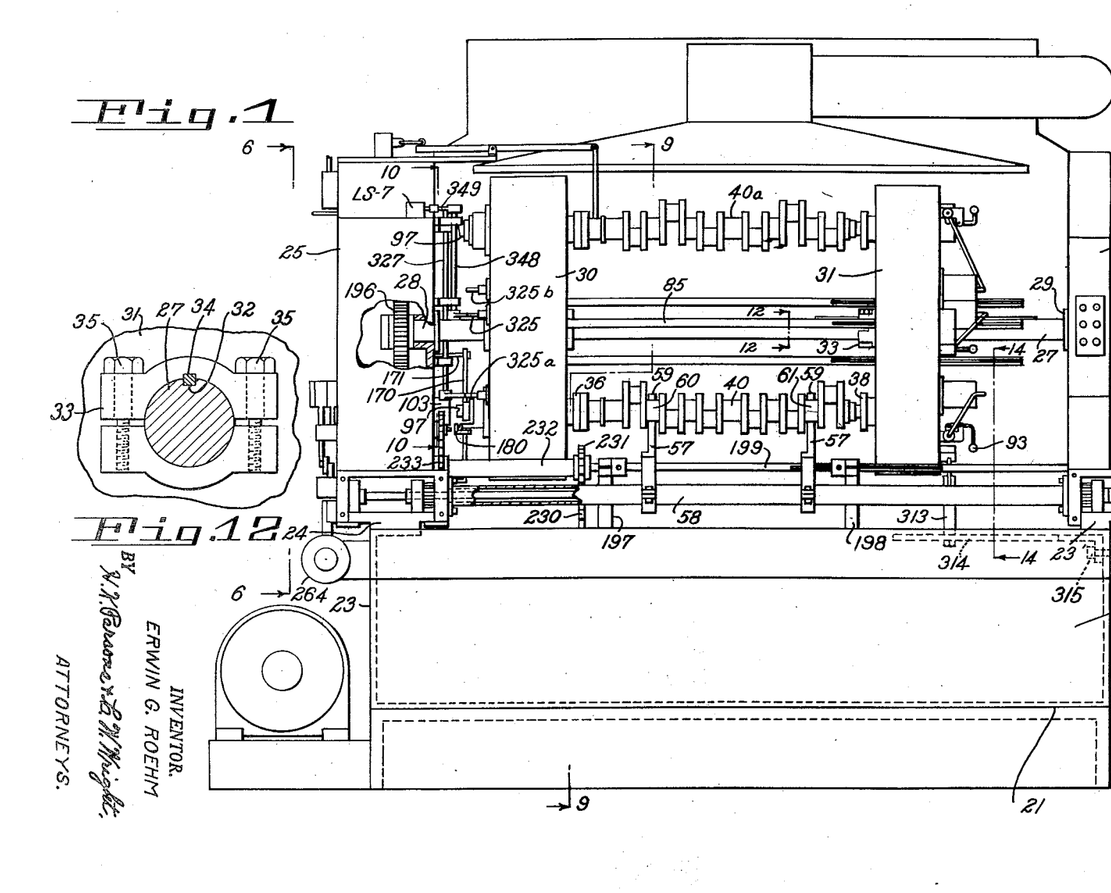
Figure 1 is a front elevation of a machine embodying the principles of this invention and viewed from the operator's loading position at the front of the machine.
Figure 12 is a detailed section on the line 12—12 of Figure 1.
Figure 2:
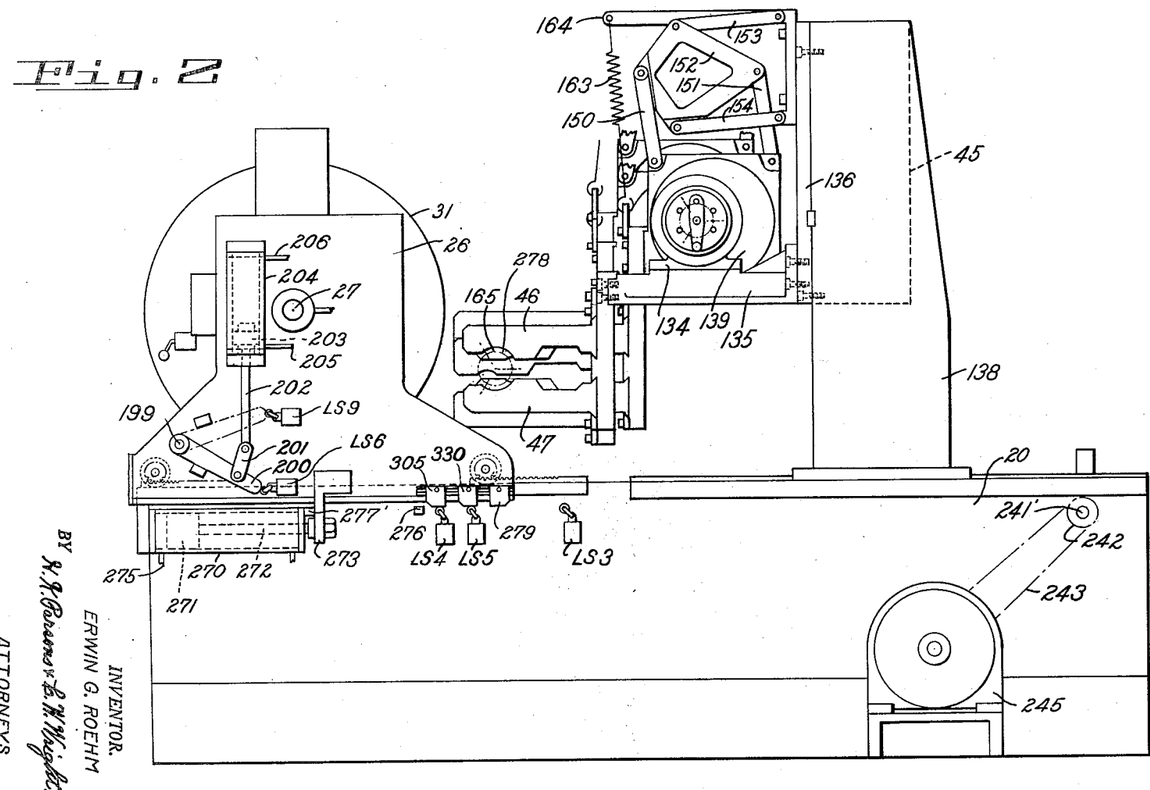
Figure 2 is a side elevational view of the machine shown in Figure 1 as viewed from the right side of that figure.

In general the machine comprises a large rectangular bed 20 as indicated in Figures 1 and 2 of the drawings having a false bottom 21 so that the bed not only forms a tank for quenching liquid, but the opposite side walls 22 and 23 form a support for a pair of guideways 23' and 24 formed on the top of the respective side walls and extending toward the rear of the machine which receive a work supporting carriage 25 comprising a headstock 25' and a tailstock 26. A rotatably indexible carrier is supported between these stocks on a shaft 27 which is journaled at 28 in the headstock 25 and in the bushing 29 in the tailstock 26 and which also helps to tie the stocks together. The carrier includes a large drum 30 fixed on the shaft 27 adjacent the headstock 25 and a second drum 31 mounted on the shaft 27 for sliding movement therealong so that adjustment can be made for different lengths of work pieces to be mounted between the drums. To this end as shown in Figure 12 the shaft 27 has a spline 32 formed therein and the drum 31 has attached thereto a bifurcated bracket 33 which surrounds the shaft and is provided with a key 34 fitting the spline 32 whereby the drum 31 may be axially adjusted along the shaft and also driven thereby in any position.

Figure 8:
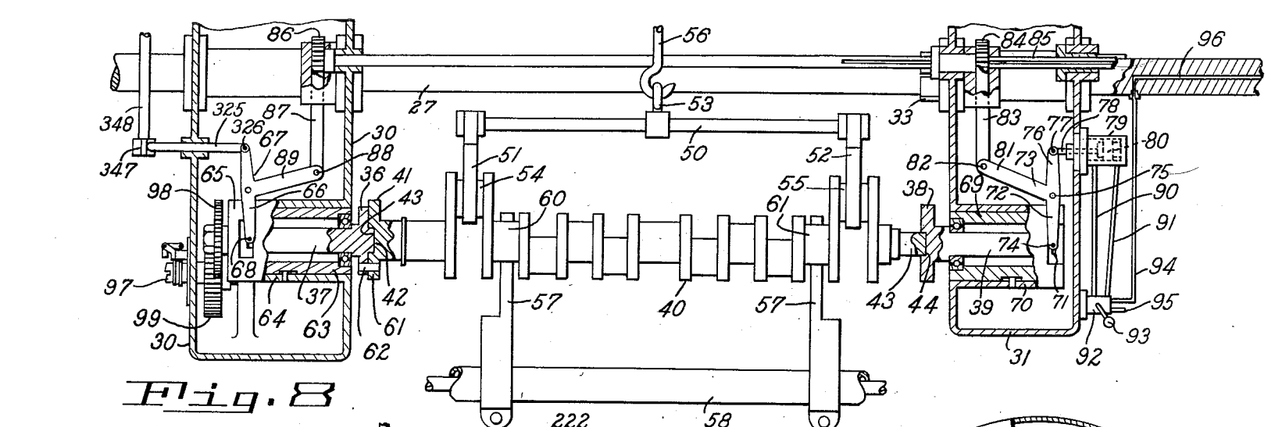
Figure 8 is an elevational view partly in section on the line 8—8 of Figure 10.

A pair of clamping screws 35 serve to clamp the bracket 33 to the shaft and fix the drum in its selected axial position. The indexible drums have three pairs of work supporting means, one pair of which is shown in Figure 8. Each pair comprises a work driving member 36 fixed to the end of a rotatable shaft 37 journaled in the drum 30, and a tailstock socket member 38 fixed to the end of a rotatable shaft 39 journaled in the drum 31. A work piece, indicated by the reference numeral 40, in the form of a crankshaft, is shown supported between the work supporting members 36 and 38. It will be noted that the crankshaft 40 has a flange 41 integral with one end in which is cut a cross slot 42, and this is adapted to fit a tooth 43 formed on the end of the member 36. The other end of the work piece terminates in an ordinary cylindrical portion 43 which fits in a circular bore 44 formed in the end face of the member 38.

Figure 9:
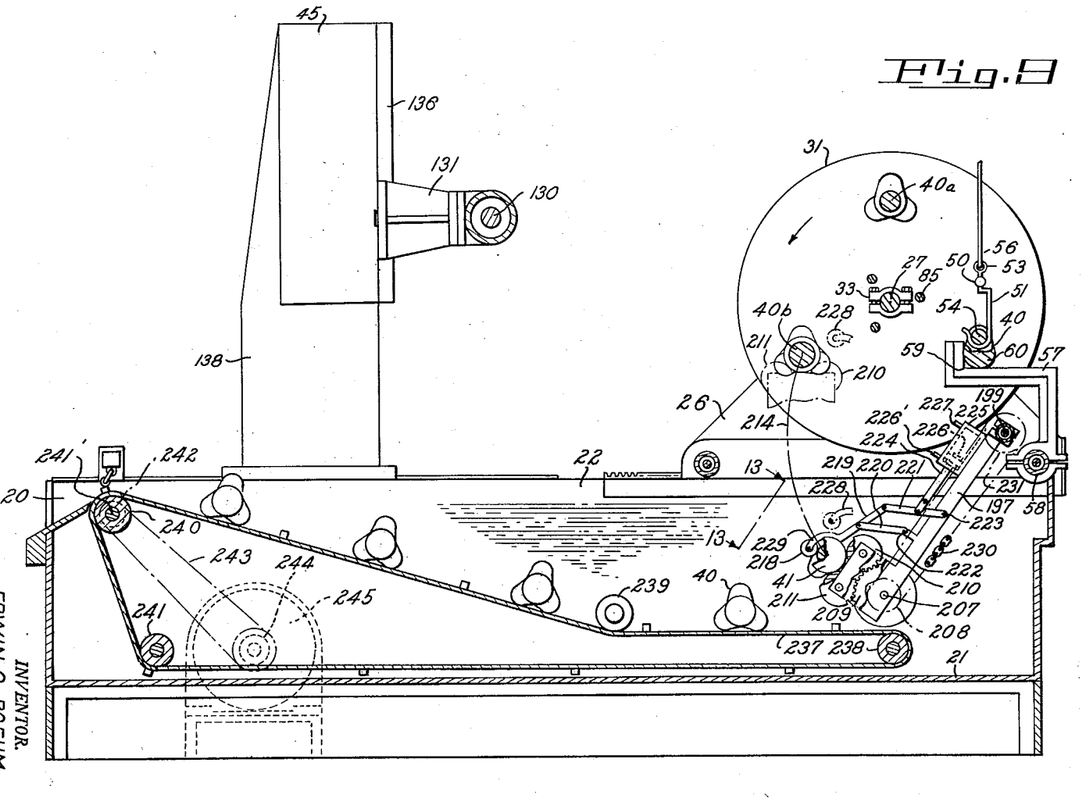
Figure 9 is a vertical section through the machine on the line 9—9 of Figure 1.

From Figure 9, it will be noted that three work pieces 40, 40a and 40b can be supported simultaneously by the indexible carrier. Extending across the rear of the bed, parallel to the axis of the work, is a work heating mechanism support indicated generally by the reference numeral 45 of the drawings. The work heating mechanism includes a plurality of burners in sufficient number that there is one for each pin and bearing on the crankshaft that is to be flame hardened. Each burner is bifurcated to form a pair of spaced jaws such as 46 and 47, shown in Figures 2 and 4, and the part to be treated is inserted between the jaws by shifting the slidable carriage. Therefore, the slidable carriage, including the head and tailstocks 25 and 26, are moved along the guideways 23' and 24 to insert the pins of the crankshaft in their respective burners for the heating operation, and upon completion of this operation the carriage is returned to the front of the machine, and the heated work piece is immediately removed from the indexible carrier and lowered into the quench tank.

In Figure 9, the position of the workpiece 40b may be termed the work heating station, the position of the work 40a may be termed the idle station, and the position of the work piece 40 may be termed the loading station. It will now be apparent that when the work piece 40b, after being heated, is removed from the indexible carrier for quenching that this station becomes empty. Thus, by indexing the carrier in a counterclockwise direction, as viewed in Figure 9, the work piece 40a is moved to the work heating station; the work piece 40 is moved to the idle station, and the empty station is moved to the loading station ready to receive a new work piece. In the operation of this machine, a work piece is first loaded, and then the operator starts the automatic heating cycle after which the carriage is returned, the heated work piece removed and the indexing operation effected.

Since the work piece in this case weighs hundreds of pounds, it is necessary to use a lifting mechanism to place the work piece in the machine, which includes a cross bar 50 shown in Figures 8 and 9. This bar has a pair of hooks 51 and 52 on opposite ends and equally spaced with respect to the center lifting eye 53. The hook spacing is adapted to correspond to the distance between the end crank pins 54 and 55 of the work piece. By utilizing these two crank pins every time to pick up each work piece, the work piece will always assume the same angular position by force of gravity after it has been lifted from the floor. This automatically positions the cross slot 42 in line with the tooth 43. The lifting eye 53 is attached to a suitable hook 56 of any conventional type of overhead crane.

To further assist in locating the work as it is swung into position, a pair of angle irons 57 are mounted on a cross tube 58 which is connected at opposite ends to the stocks 25 and 26. These angle irons are provided with a corner angle 59 which are adapted to receive the bearing pins 60 and 61 of the crankshaft because the axis of these bearing pins corresponds to the axis of rotation of the crankshaft. It will now be seen that the corner angle 59 locates the crankshaft horizontally and vertically with its axis of rotation in substantial alignment with the axis of rotation of the shafts 37 and 39 shown in Figure 8.

It is also necessary to note that by picking up the shaft by the crank pins 54 and 55 that the shaft is oriented rotatably to align the cross slot 42 in the end flange 41 of the work piece with the driving tooth 43 formed on the face of the work driver 36 and also to position a hole 61' in the end flange 41 of the work piece in alignment with the driving pin 62 projecting from the face of the work driver 36. It is also necessary to have the work driver in the proper position, and this means that each time the work driver stops, it must be stopped in the correct position or moved to the correct position after it has stopped. This will be made clear as the description progresses.

The shafts 37 and 39 are retractable for work loading purposes. To this end the shaft 37 is bearinged in a sleeve 63, Figure 8, which is slidably mounted in a tubular housing 64 formed integral with the drum 30. The housing has a slot 65 formed therein so that the arm 66 of a crank 67 may be pivotally connected at 68 to the sleeve 63. It will now be evident that rotation of the crank 67 will reciprocate the sleeve. Similarly, the shaft 39 is bearinged in a sleeve 69 slidably mounted in a housing 70 which is cut away so that a slot 71 formed in the sleeve may be engaged by a pin 74 in the arm 72 of a crank 73. The crank 73 is rotatable about a fixed pivot 75 and has a second arm 76 which is pivotally connected at 77 to the piston rod 78 of an air cylinder 79 containing a piston 80 connected to the end of the piston rod 78. The crank 73 has a third arm 81 which is pivotally connected at 82 to a reciprocable rack member 83 which meshes with a gear 84 on a spline shaft 85. The spline shaft 85 extends from the drum 31 to the drum 30 where it is provided with another gear 86 meshing with a similar rack member 87 pivotally connected at 88 to an arm 89 of the crank 67.

Thus, the cylinder 79 is operatively connected for simultaneously effecting power retraction of both shafts 37 and 39. The cylinder 79 is connected by a pair of channels 90 and 91 to a control valve 92 having an operating handle 93 which is operative to connect a flexible pressure line 94 to either of the channels 90, 91. The valve may be provided with an exhaust pipe 95. Since the drum 31 rotates, the pressure channel 94 is connected to the shaft 27 which may be provided with an internal bore 96 so that a source of pressure may be connected to the end of the shaft without interfering with rotation thereof. It will now be clear that by operating the handle 93, the work piece may be clamped in the work holders after it is swung into position between them by the lifting mechanism.

Figures 7, 11:
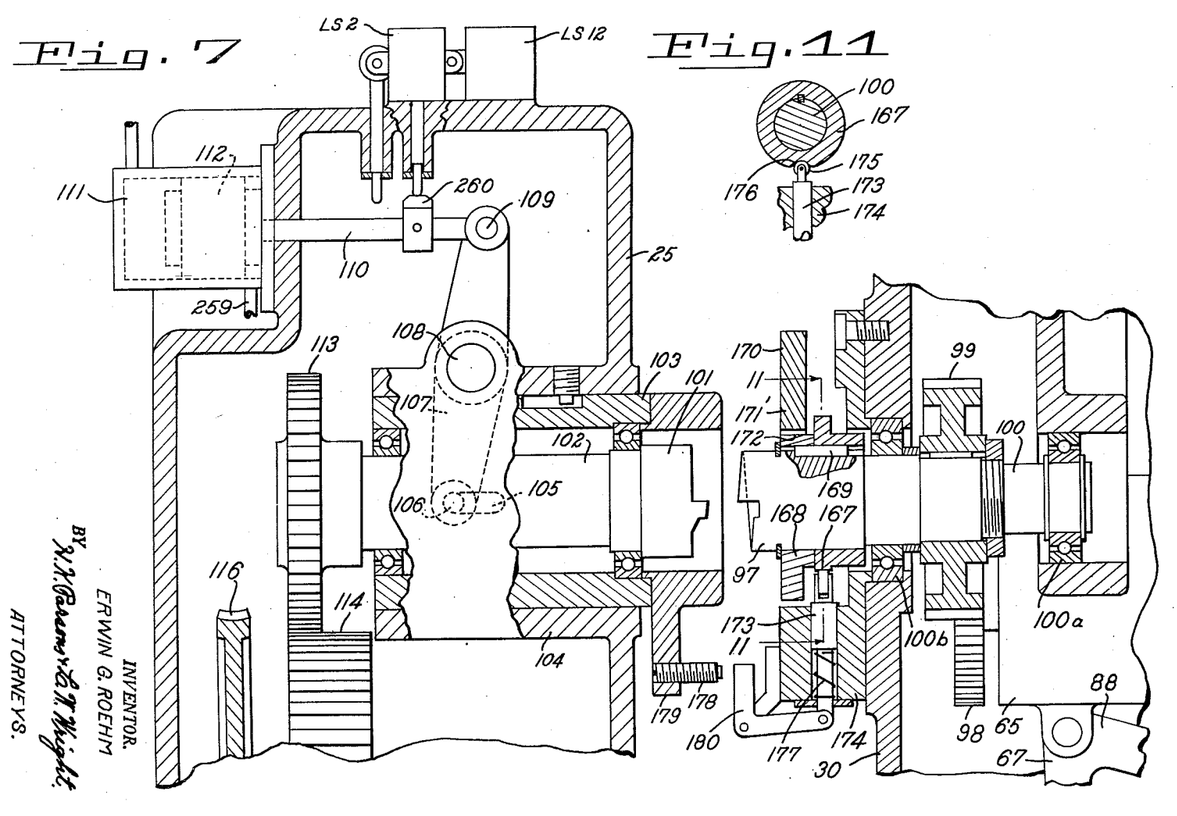
Figure 7 is a sectional view on the line 7—7 of Figure 6.
Figure 11 is a detail section on the line 11—11 of Figure 7.

Each one of the three driving members 36 has its own driving mechanism in the drum 30, and each mechanism terminates in a one tooth clutch 97 similar to that shown in Figure 7. In other words, the shaft 37 has a driving gear 98 secured to the end thereof, and this gear meshes with a wide-faced pinion gear 99 to permit sliding movement of the gear 98 relative thereto when the shaft is shifted. The gear 99, as shown in Figure 7, is secured to a short shaft 100 journaled in anti-friction bearings 100a and 100b carried by drum 30, which terminates in the one tooth clutch 97. When the work piece reaches the heating station, the one tooth clutch 97 is automatically aligned with a one tooth driving clutch 101 which is secured to the end of a shaft 102 which is journaled in a slidable sleeve 103 mounted in the headstock 25. The housing 104, which contains the sleeve 103, has a slot 105 formed in its periphery so that a pin 106 mounted in the end of a crank 107 may engage the sleeve 103 for shifting the same.

The crank 107 is pivoted at 108 on the housing 104 and has its other end pivotally connected at 109 to a piston rod 110 of an air cylinder 111 containing a piston 112 secured to the end of the piston rod. By admitting air pressure to the cylinder 112, the sleeve 103 may be reciprocated, and in the position of the parts shown in Figure 7, may be moved to the right to effect engagement of the clutch members 101 and 97. The shaft 102 has a spur gear 113 secured to the end thereof which meshes with a wide faced opinion gear 114 integral with a shaft 115, shown in Figure 6, which also has integrally connected therewith a worm wheel 116 which meshes with a worm 117 keyed to the main drive shaft 118. The drive shaft 118 extends to the rear of the machine and has a pulley 119 secured to the end thereof which is operatively connected by a belt 120 to pulley 121 secured to the drive shaft of a motor 122.

Figures 6, 14:
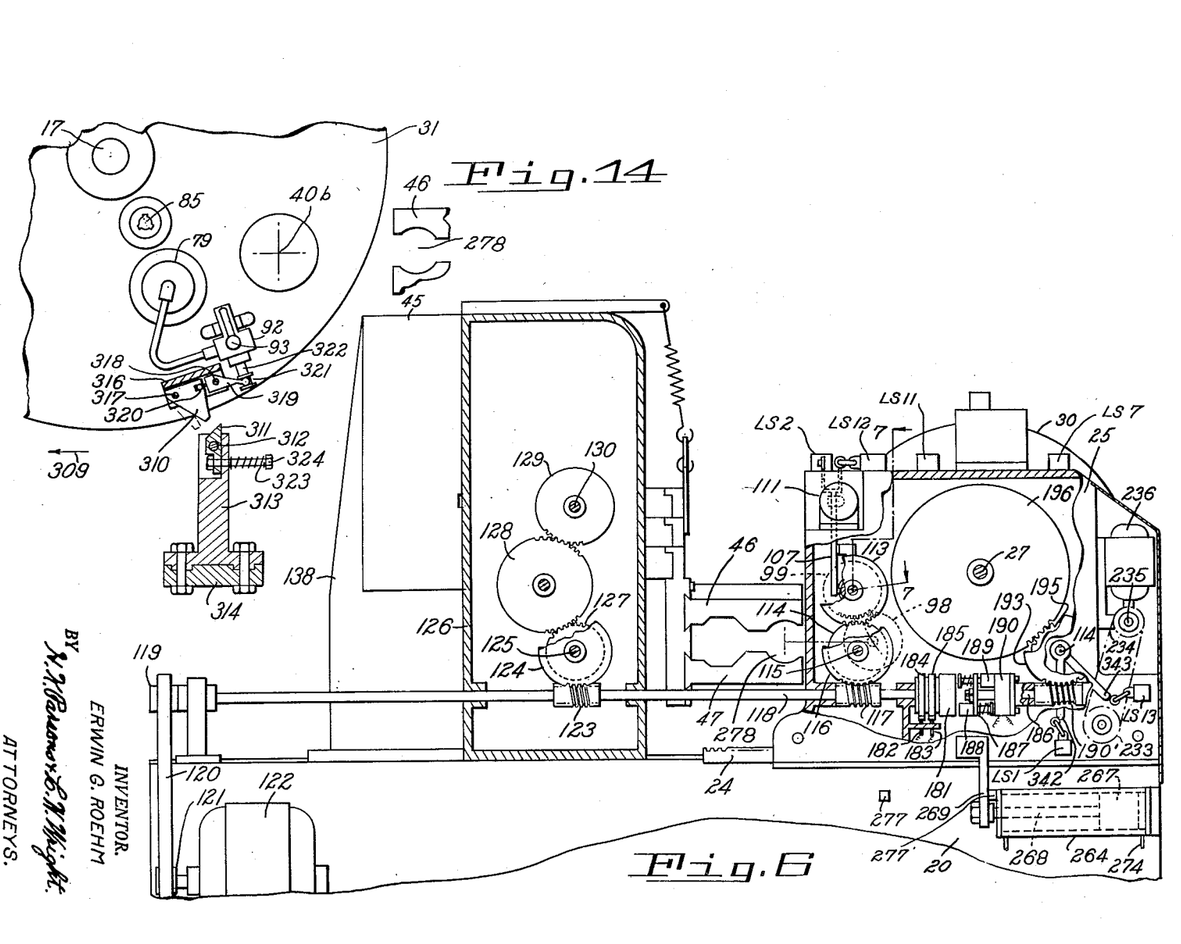
Figure 6 is a side elevational view partly in section as viewed on the line 6—6 of Figure 1.
Figure 14 is a detail view on the line 14—14 of Figure 1.

It will now be seen, by comparison of Figures 6 and 9, that the one-toothed clutch member 101 is located at the heating station and is successively engageable with clutches 97 as they arrive at the heating station by indexing of the carrier to effect rotation of the particular work piece being heated.

Figure 3:
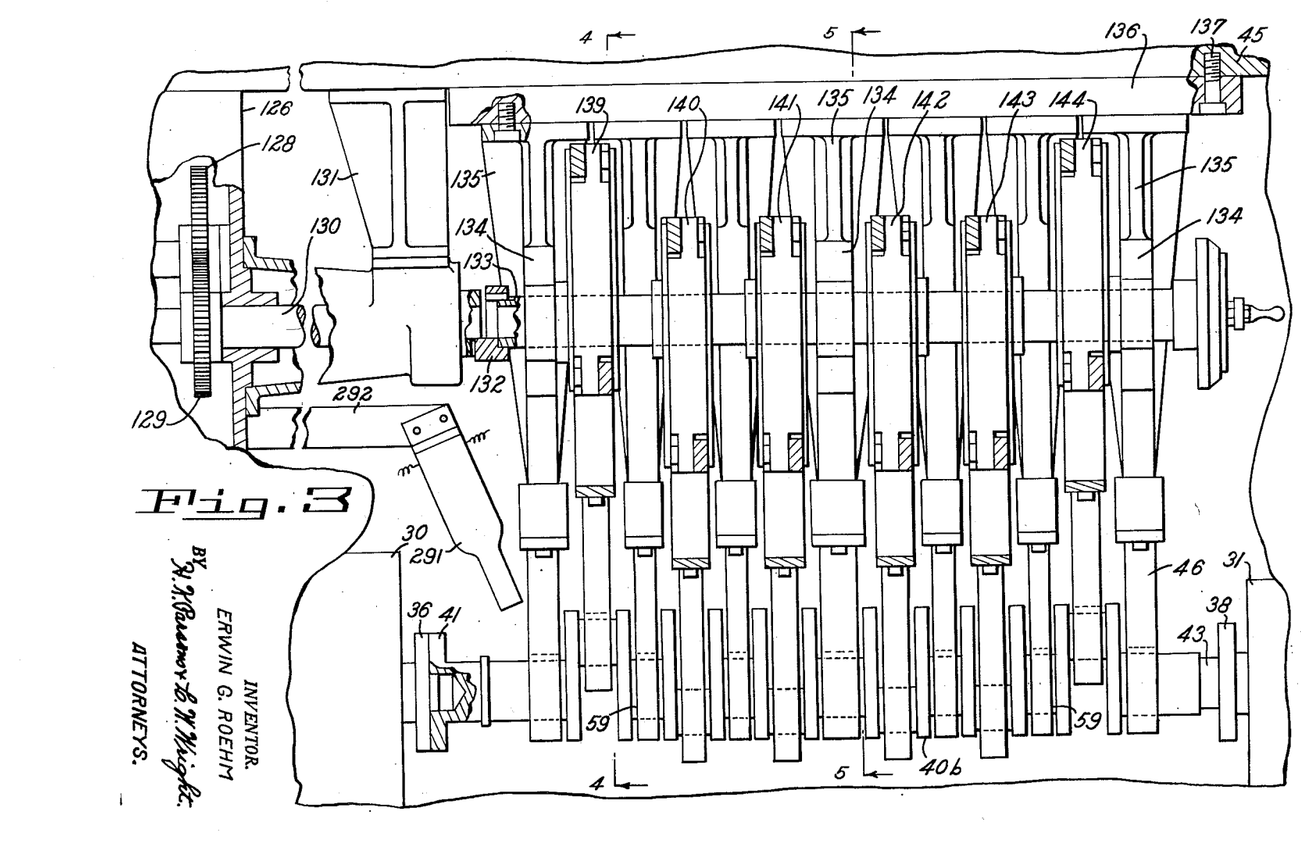
Figure 3 is a plan view showing a work piece in operative relation to the respective burners for heating the various portions of a crankshaft.

The drive shaft 119 is also connected for continuous actuation of the various burners in synchronism with the rotation of the work. As shown in Figure 6, the drive shaft 118 is provided with a worm 123 which meshes with a worm wheel 124 mounted on a shaft 125 which is journaled in a housing 126 mounted on the bed of the machine. The shaft has connected to it a spur gear 127 which is operatively connected through idler gear 128 to spur gear 129 fixed to a shaft 130. The shaft 130, as shown in Figure 3, projects from the housing 126 and its outer end is supported by a bracket 131 attached to the housing 45.

Figure 4:
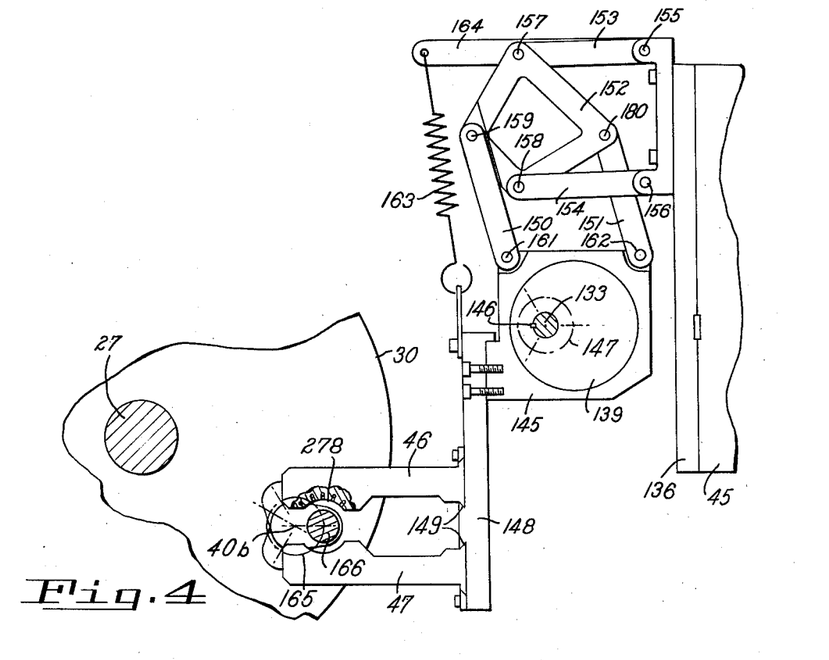
Figure 4 is a detail sectional view on the line 4—4 of Figure 3 showing one of the burners for heating a crankpin and the mechanism for supporting it.
Figure 5:
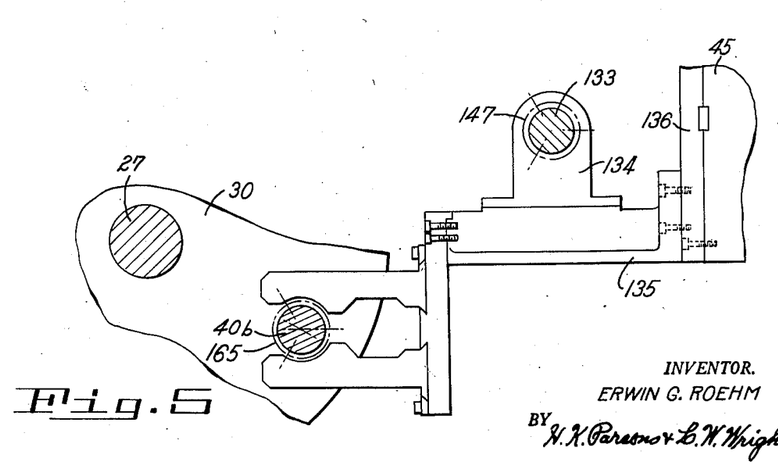
Figure 5 is a detail view in elevation of one of the burners for heating a bearing portion of a crankshaft as viewed on the line 5—5 of Figure 3.

The projecting end of the shaft 130 is connected by a coupling 132 to a cam shaft 133. The cam shaft is supported by three pillow blocks 134 mounted on the top of brackets 135 which are attached to a plate 136, as more particularly shown in Figure 5. The plate 136 is secured by bolts 137 to the member 45 which extends across the rear of the machine from the upright standard 138 located on one side of the machine, as shown in Figures 2 and 6, to the upright or standard 126 located on the other side of the machine. As shown in Figures 2, 3 and 4, the cam shaft 133 has a number of eccentrically mounted members thereon indicated by the reference numerals 139, 140, 141, 142, 143 and 144. As shown in Figure 4, each cam member, such as 139, is journaled in a block 145. Since the member 139 is keyed at 146 to the shaft 133 it will be apparent that upon rotation of the shaft that the center of the member 139 will move in a circular path indicated by the dot and dash circle 147 and thereby move the supported block 145 in a like manner. The block 145 has a dependent arm 148 secured thereto, and this arm has a pair of dovetailed guideways 149 formed therein for receiving the ends of the burner jaws 46 and 47.

Since it is necessary to maintain the burner jaws substantially horizontal during their eccentric movement, the block 145 is connected or supported by a parallel motion linkage mechanism. From Figure 4 is will be noted that a pair of parallel links 150 and 151 are pivotally connected at spaced points to the upper side of the member 145. These links are of the same length and are connected to opposite corners of an intermediate member 152. This member is connected by a second pair of parallel links 153 and 154 of equal length to fixed pivots 155 and 156 supported by the plate 136. The spacing between the pivots 155 and 156 is equal to the spacing between pivots 157 and 158, and the distance between the pivots 159 and 160 is equal to the spacing between the pivots 161 and 162. Thus, as the block 145 moves up and down due to rotation of the cam 139, the depending member 148 will be maintained in substantially a vertical position, and the arms 46 and 47 will be maintained in substantially a horizontal position.

In order to counterbalance the overhanging weight of the arms 46 and 47, the bracket 148 is connected by a spring 163 to a fixed overhanging arm 164 projecting from the plate 136. It is to be noted that the eccentricity of the member 139 is equal to the eccentricity or throw of the crank pin of the crankshafts which means that the circle of rotation 147 of the center of the eccentric is equal to the circle of rotation 165, indicated in Figure 4 as representing the circle of rotation of the center of the crank pin 166. Although the burner and the crank pin thus move in equal circles, it is necessary to have them in phase because the crank pin enters the burner while they are both rotating. This is taken care of initially in the set-up of the machine in that there is a common drive to the shaft 130, and to the one tooth clutch member 101 referred to in connection with Figure 7, and it is only necessary in the original assembly of the machine to utilize the coupling 132 to connect the cam shaft 133 in the proper angular relation to its drive shaft 130 when all of the cam members on the shaft 133 are properly oriented with respect to the crank pins with which they cooperate. It is also to be noted that the cam shaft 133 is continuously rotating during operation of the machine, but due to the one tooth clutch 101, the work piece is always connected in proper phased relation to the cam shaft 133, thus making it possible to insert the crank pins in their respective burners even while all the parts are rotating, and it is not necessary to stop the rotation of the cam shaft 133 each time a work piece is retracted by the carriage after a heating operation.

It should now be clear that the work piece is always placed in the machine in the same angular position and that the cross key 43 in the plate 36, Figure 8, must always be in the proper angular relationship for insertion in a slot 42 in the end of the work. Therefore, to insure that each one of the drive mechanisms is in proper position to receive a work piece at the loading station, the one tooth clutch 97, as shown in Figures 7 and 10, has a detent member 167 and a flat sided collar 168 keyed thereto by a key 169.

Figure 10:
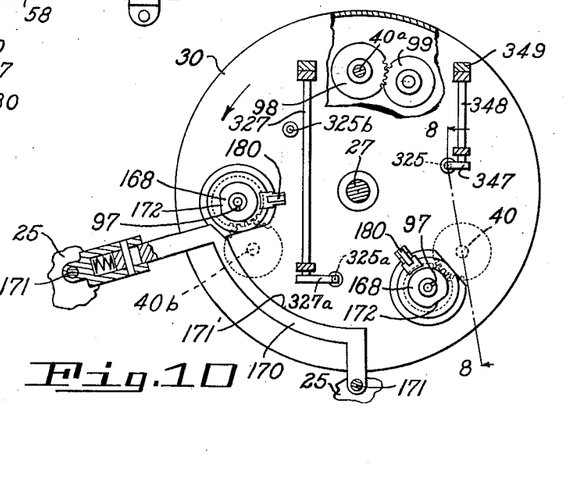
Figure 10 is a detail section as viewed on the line 10—10 of Figure 1.

Referring now to Figure 10, a curved locator plate 170 is resiliently supported on the headstock 25 by pins 171 and spring 170' interposed between the sections of one leg of the plate. When the drum 30 is indexed counterclockwise, the collar 168 will contact the curved surface 171' of the member 170 and be rotated thereby due to friction between the parts until the flat 172 is opposite or parallel to the surface 171 whereby the rotation will stop. Simultaneously, a detent plunger 173, Figure 11, slidably mounted in a plate 174 attached to the drum 30 and having a roller 175 in its end, engages a notch 176 in the detent ring 167 and thereby holds the parts in proper relationship. A spring 177 serves to hold the detent engaged. When it comes time for the one tooth clutch to be engaged, a set screw 178 threaded in a wing 179 projecting from the sleeve 103 engages one arm of a bell crank 180 connected to plunger 173 and thereby withdraws the detent to permit free rotation of the parts.

Attention is called to the fact that the rotation of the collar 168 not only positions the parts so that the detent will engage but also rotates the tooth 43 in Figure 8 into proper position to engage the work piece. After the work piece has been engaged, it is held in a definite angular relation to the one tooth clutch 97 and the one tooth clutch is held in a definite position by the detent until it is time to drive it.

Indexing mechanism

The drive shaft 118 is also utilized for driving the drum indexing mechanism. As shown in Figure 6, a magnetic clutch indicated generally by the reference numeral 181, is attached to the end of the shaft 118 and therefore is continuously rotated thereby. Electric current is supplied to the clutch member by means of a pair of fixed brushes 182 and 183 which engage respectively a pair of commutator rings 184 and 185 carried by the shaft but insulated therefrom. The commutator rings are electrically connected to the clutch magnets in the usual manner to form a circuit therethrough. An indexing drive shaft 186 is supported for rotation coaxially with the shaft 118 and has an armature plate 187 attached to one end thereof adjacent the magnet 181. The plate 187 carries a plurality of armatures 188 which are resiliently supported in the plate 187 for magnetic attraction by the clutch 181 for imparting rotation to the shaft 186. In addition, the plate 187 carries another set of armature blocks 189 resiliently mounted on the opposite side of the plate for attraction by a brake magnet 190 which is fixed against rotation and serves to stop the rotation of the shaft 186 when it is declutched from the shaft 118. The shaft 186 has a worm 190' fixed thereto in mesh with a worm wheel 193 keyed to a shaft 194 which also has keyed thereto a spur gear 195. The spur gear meshes with an indexing gear 196 which is fixed to the end of the shaft 27 that supports the drums. The sequential operation of the magnets will be explained in connection with the electrical circuit.

Quenching mechanism

The mechanism for immersing a heated work piece in the quench after withdrawal from the burners is shown more particularly in Figure 9. This mechanism comprises two arms, indicated generally by the reference numerals 197 and 198 in Figure 1 which are fixed to a rotatable shaft 199 which extends across the front of the machine. One end of the shaft is journaled in the tailstock 26 as shown in Figure 2. From this figure it will be noted that an arm 200 is keyed to the end of the shaft 199 and connected by a link 201 to the end of a piston rod 202 which, in turn, is connected to a piston 203 slidably mounted in a cylinder 204 mounted on the member 26. The opposite ends of the cylinder have pipe connections 205 and 206 by which compressed air is admitted to one end or the other of the cylinder to raise or lower the arm 200 and thereby rock the shaft 199 to raise and lower the arms 197 and 198.

Figure 13:
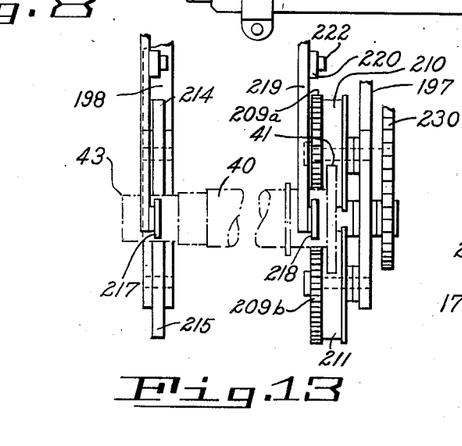
Figure 13 is a detailed view on the line 13—13 of Figure 9.

The arm 197 as shown in Figure 9 of the drawings is provided with a shaft 207 journaled in the end thereof. The shaft 207 has a sprocket gear 208 fixed thereto and also a gear 209. The gear 209 meshes with gear teeth 209a and 209b formed on one flange of a pair of grooved rollers 210 and 211 respectively and shown in Figure 13 as mounted on the arm 197. The groove of these rollers is wide enough to receive the flange 41 formed on the end of the work piece. Adjacent the end of this flange on the end of the work piece is an annular groove 212 which is of such a nature as to clear the toothed flanges 213 formed on the rollers whereby when the arm is raised through an arc, as indicated by the dash and dot line 214 in Figure 9, the grooved rollers will engage the flange on the work piece. The other arm 198 also has a pair of rollers 214 and 215 which are positioned to engage the reduced end 43 of the work piece, and both sets of rollers engage the underside of the work piece for receiving and supporting it when the centers are withdrawn in the carrier. To insure that the work pieces are securely held in the ends of the arms, separate clamping rollers 217 and 218 are provided, one for each end of the work, and these clamping rollers are mounted in the end of a link 219 of a parallel motion linkage comprising a pair of parallel arms 220 and 221 which are pivotally connected to the arm 197 by pivots 222 and 223 respectively. The link 221 is operatively connected to the end of a piston rod 224 slidably mounted in a cylinder 225 carried by the arm 197 and containing a piston 226 which is connected to the end of the piston rod. By admitting air to opposite ends of the cylinder 225 through pipe connections 226' and 227 the piston may be moved back and forth to move the roller from an unclamping position, indicated by the dash and dot lines 228 in Figure 9, to a clamping position indicated by the reference numeral 229.

A duplicate operating mechanism is mounted on the arm 198 for operating the roller 217. Thus, when the arms are raised to receive the work piece, the pistons 226 are actuated to clamp the work piece to the carrier arms, and then both arms are swung downward to immerse the work piece in the quench. To insure that the quenching is more thorough, means are provided for rotating the various guide rollers to cause rotation of the work piece while being quenched. This is accomplished by connecting the sprocket wheel 208 by means of a chain 230 to a sprocket wheel 231 shown in Figure 1, the sprocket wheel being connected to the end of a tubular shaft 232 which extends to the headstock 25 where it is provided with a sprocket wheel 233. As shown in Figure 6, the sprocket wheel 233 is connected by another chain 234 to a sprocket wheel 235 driven by a motor 236.

The motor 236 is continuously actuated during operation of the machine, and thus as soon as a work piece is clamped in the mechanism, it is started to rotate. The quenching mechanism not only lowers the work piece into the quench but still maintains control over it during the next advance movement of the slide, with the result that the work piece is not only rotated in the quench, but is bodily moved through the quench at the same time. It is after this advance movement that the mechanism releases the work piece, and it rolls out onto the conveyor belt 237.

This belt is supported and guided by suitable sprocket wheels 238, 239, 240 and 241 and extends substantially the full length of the quench tank and is intermittently operated to remove a work piece from the tank. The sprocket wheel 240 is mounted on a shaft 241 which passes through the side of the machine and is provided with a pulley 242 which is connected by a belt 243 to the pulley 244 of a motor 245. Thus, by intermittently operating the motor the conveyor belt will be moved the desired amount.

*Automatic cycle of operation*

Before describing the automatic operation of this machine, a starting point must be assumed, and for this purpose it will be assumed that the indexible carrier is completely loaded with work pieces at the three stations. It will also be assumed that the slidable carriage which supports the indexible carrier is at the front of the machine. By closing the main switch 246, shown at top left in Figure 15, the main driving member 122 will be energized and, as previously explained, this motor may run continuously. Similar provision may be made for motor 236 which runs continuously. This means that the burners shown in Figures 3, 4, and 5 will be continuously oscillated in their circular path, the radius of which is equal to the throw of the crank pins to be treated.

The closing of switch 246 also energizes the transformer 247, the secondary 248 of which is connected to the parallel power lines 249 and 250 of the electrical control circuit. The operator may now close the start button 251 to energize the automatic cycle control relay CR1 through line 252, which has serially arranged therein a stop button 253 and a selector switch 254 which selects between automatic and manual operation. When the switch is in the position shown, the contact 255 is closed, and the contact 256 is open, thereby breaking the circuit to the manual control relay CR2-A. Actuation of relay CR1 closes its latching contact CR1—1, thereby completing a latching circuit around the start button 251 so that the same may be released by the operator.

Figure 15:
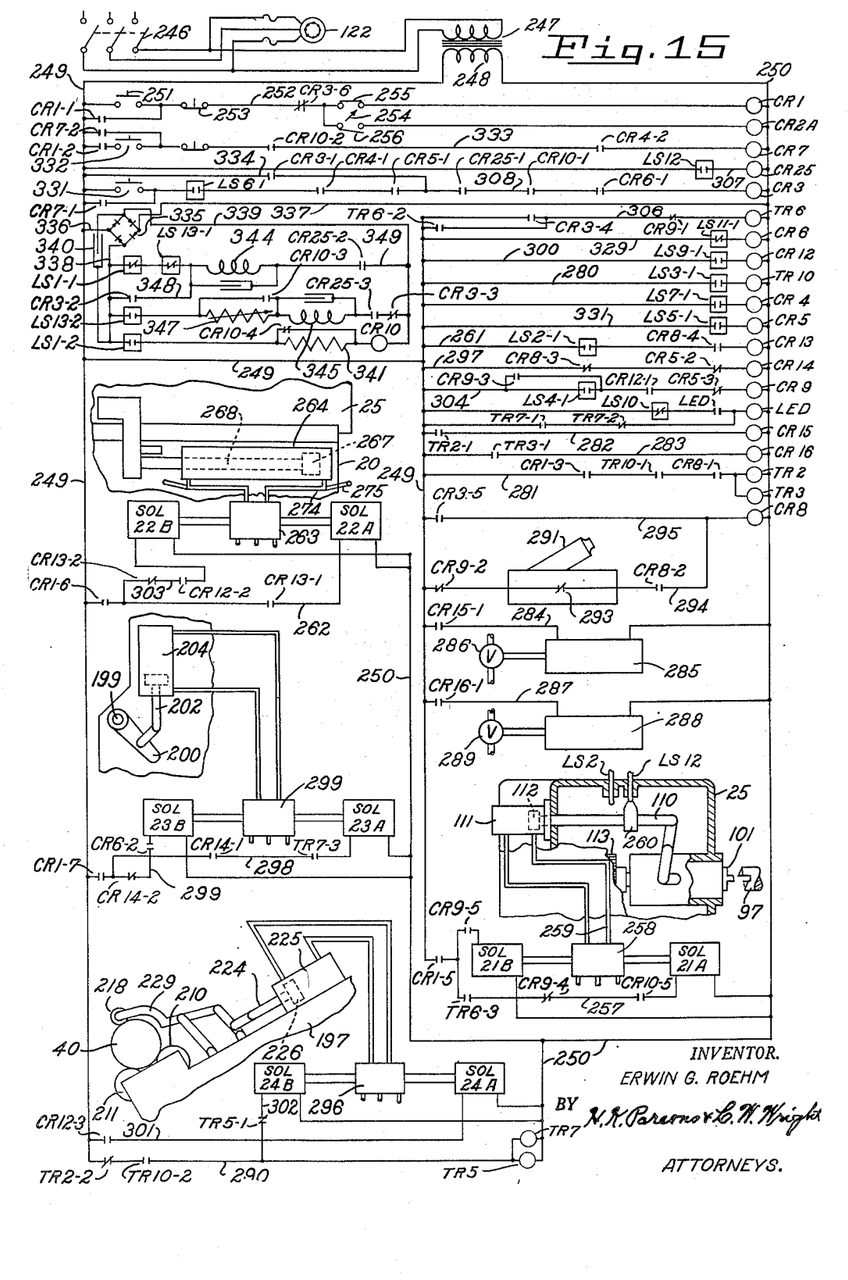
Figure 15 is a diagram of the control circuit for the machine.

The cycle control relay CR1 has a number of contacts which are closed upon operation of the relay to set up the circuit for automatic operation, and one of these contacts is CR1—5, lower right of Figure 15, for energizing solenoid 21A to engage work driving clutch at heating station of indexible support. CR1—5 completes a circuit from 249 through line 257 to solenoid 21A, which line has serially arranged contacts TR6—3, CR9—4, and CR10—5 therein, but these contacts are all closed at this time so that solenoid 21A is immediately energized to actuate the control valve 258 which admits air pressure to line 259 and thereby shifts the piston 112, shown in Figure 7, to engage the one tooth driving clutch 101 and thus start rotation of the work piece located at the heating station. Since this is the only work driving clutch, the work pieces at the other two stations will not be rotated.

When the piston 112 is to the left, a dog 260 carried by the piston rod 110 releases limit switch LS12 and actuates limit switch LS2, shown in Figure 7. The limit switch LS2 closes its contact LS2—1 in line 261 to relay CR13, the contact CR8—4 being closed at this time.

Energization of relay CR13 closes its contact CR13—1 in line 262 leading to slide control solenoid 22A. Contact CR1—6 in line 262 is already closed by operation of the automatic cycle control relay CR1. Solenoid 22A shifts the control valve 263 to admit fluid pressure to a pair of cylinders, one of which, 264, is shown in Figure 15 and is located on the left side of the bed as shown in Figure 6. This cylinder has a piston 267 which is connected by a piston rod 268 to a bracket 269 attached to and depending from the headstock 25. A second cylinder 270 is attached to the other side of the bed, as shown in Figure 2, and has a piston 271 connected by a piston rod 272 to a bracket 273 attached to and depending from the tailstock 26. The valve 263 therefor connects pressure to the branch lines 274 and 275 simultaneously to cause advance movement of the slide comprising the head and tailstocks. This moves the work piece to be heated into the burners, and it will be remembered that both the crank pins on the work piece, and the burners are moving in phase and synchronism in a circular path, and, therefore, the pins will enter their respective burners, even although the parts are in a state of rotation.

It will be noted from Figures 2 and 6 that the bed is provided with positive stops 276 and 277 which serve to stop or limit the advance movement of the slide, and this will position the crankpins in the enlargement or heating throat of the respective burners, as indicated by the reference numeral 278 in Figure 4 of the drawings.

As the slide reaches its advanced movement, a dog 279 carried by the tailstock operates limit switch LS3. This causes the switch to close its contact LS3—1 in line 280 and thereby energize the timer relay TR10.

This relay closes its contact TR10—1 in line 281, leading to timer relays TR2 and TR3 which control firing of the burners, and since contact CR1—3 has been closed by the automatic cycle control relay CR1 and the contact CR8—1 is closed at this time, a circuit is completed to timer relays TR2 and TR3. Timer relay TR2 closes its contact TR2—1 in line 282 to energize gas control relay CR15; and timer relay TR3 closes its contact TR3—1 in line 283 to energize gas control relay CR16. Relay CR15 is immediately operated while there is a slight delay in operation of relay CR16 by its timer relay, and this is because the relay CR15 through its contact CR15—1 in line 284 controls the opening of the gas valve control solenoid 285 which operates valve 286 to turn on the acetylene or propane gas, while the relay CR16 controls contact CR16—1 in line 287 to energize solenoid 288 which opens the oxygen control valve 289. It is desirable that one gas be lit before the oxygen is added to the flame. The method of lighting the gas is not disclosed herein and any conventional means may be utilized for lighting the gas when it is turned on. It will now be seen that as soon as the work piece has been advanced into the burners, the heating gas is turned on and lit and the heating operation of all the pins is started. An automatic temperature control pick-up 291, Figure 5, has been provided for determining when the work piece has reached the desired temperature so that the heating operation may be automatically discontinued.

At this point it is desired to stop and explain what has been occurring with respect to the quenching mechanism because at this point it begins to enter into the automatic cycle in preparation for removing the work piece which is now being heated, and, at the proper point in the cycle, lowering it into the quench tank. When the slide was advanced to move the present work piece into heating position, the quenching mechanism shown in Figure 9, is in its lowered position in the quench tank as shown in that figure, and since the elevating arms are mounted on a shaft supported by the slide, the apparatus will move forward and thereby move the previously heated work piece which is still in the mechanism, bodily through the oil in the quench tank, and while still being rotated by the motor 235. It will, therefore, be seen that while the present work piece is being heated that the previously heated work piece is still being rotated in the bottom of the quench tank, and it is necessary that this work piece be released, and the quenching mechanism moved into position preparatory to receiving the work piece now being heated. The first step in this direction was started by the operation of the timer relay TR10 when energized by the limit switch LS3 to condition a circuit for later operation of the cylinder 225 of the quenching mechanism. The relay TR10 effects immediate closing of its contact TR10—1 and delayed closing of its contact TR10—2. The closing of TR10—1 immediately operates relay TR2, thereby opening its contact TR2—2 in line 290 to solenoid 248 shown at the bottom of Figure 15, before TR10—2 closes in that line.

While the work is being heated, means are provided for continuously ascertaining the temperature of the work, and this is accomplished by providing an electric thermopile device indicated by the reference numeral 291 in Figure 3 which is supported on a bracket 292 projecting from the support 126. It will be noted that this device is focused on one of the bearing pins which would be representative of the temperature of all of the pins being heated. This device is a commercial device sold under the trade name of Speed-O-Max, and therefore further description thereof is not necessary except to say that this device includes a normally closed switch indicated by the reference numeral 293 in the electrical diagram and when the temperature of the work reaches the desired point the normally closed switch is automatically opened. It will be noted that this switch is in line 294 and is connected in parallel with switch contact CR3—5 to line 295. The line 295 terminates in control relay CR8. It is sufficient to say at this time that the contact CR3—5 is closed by the previous operation of the indexing mechanism and will be further described later in connection with the operation of the indexing. Therefore, the relay CR8 has been previously energized and in so doing closed its latching contact CR8—2 in line 294, thereby completing a circuit through relay contact CR9—2, switch 293, and latching contact CR8—2. Since the relay CR9 is not energized at this time, the contact CR9—2 will be closed because it is a normally closed contact. It will now be seen that there is a circuit to the control relay CR8 which will be broken when the switch 293 is automatically opened by the temperature control mechanism in response to the work having been heated to the required temperature.

The immediate effect of releasing the relay CR8 is to open its contact CR8—1 in line 281, thereby releasing the timer relays TR2 and TR3. Release of the timer relay TR2 closes its normally closed contact TR2—2 in line 290, thereby completing the circuit previously conditioned to solenoid 24B which now becomes energized to operate its valve 296 to which it is operatively connected and cause admission of fluid pressure to cylinder 225 and thereby move piston 226 in a direction to release the work clamping fingers 229. The work piece therein will immediately roll out of the quenching fixture onto the conveyor belt 237.

The closing of the circuit in line 290 also completed a circuit to energize timer relays TR5 and TR7. In conjunction with this, the release of relay CR8 caused its normally closed contact CR8—3 in line 297 to relay CR14 to close, thereby completing a circuit through normally closed contact CR5—2 to energize relay CR14. This relay has two contacts CR14—1 and CR14—2 in connection with solenoids 23A and 23B which control the operation of the elevating arms 197 of the quenching fixture. This relay acts as a selector in that when the relay is energized it closes contact CR14—1 and sets up a circuit through line 298 to solenoid 23A and simultaneously opens its normally closed contact CR14—2 to break the circuit in line 299 to deenergize solenoid 23A. It will now be seen that the circuit to solenoid 23B is broken and the circuit through line 298 is completed, not only through the closing of contact CR14—1 but also the closing of contact TR7—3 associated with the timer relay TR7 which has just been described. The result is that the solenoid 23A will be energized and thereby operate the control valve 299 operatively connected to it and admit air pressure to cylinder 204, thereby raising the operating arms 197 of the quenching fixture. This will move up into position along the dash and dot line indicated by the line 214 in Figure 9 in position to grasp the work piece which has just been heated.

While this has been going on, the timer relay TR2 and TR3 have been effective in extinguishing the heating flames by opening the contacts TR2—1 and TR3—1 in the circuits to the gas control relay CR15 and CR16 which, as previously described, control the operation of the gas valve solenoids 285 and 288. The timer relay TR3 is set to instantaneously operate while the timer relay TR2 has a delayed operation whereby the oxygen gas will be turned off first. It will now be seen that by the time the quench mechanism has been elevated into position that the heating flames have been extinguished.

When the work arms complete their upward movement the operating arm 200 shown in Figure 2 operates limit switch LS9 which, as shown in Figure 15, closes its contact LS9—1 in line 300 and completes circuit to control relay CR12. This relay closes its contact CR12—3 in line 301 at the bottom of Figure 15 to solenoid 24A. It is to be noted that when the timer relay TR5 was energized, it opened its normally closed contact CR5—1 in branch line 302 leading to solenoid 24B whereby solenoid 24B becomes deenergized just prior to the energization of solenoid 24A, thereby permitting the latter to shift the valve 296 and cause reverse operation of piston 226 and thereby engagement of the work by the work clamping and driving rollers 218, 210 and 211.

As previously explained, the control relay CR13 was energized by the closing of contacts LS2—1 and CR8—4 so that the deenergization of relay CR8 by the temperature control mechanism opened the contact CR8—4 and thereby deenergized relay CR13. The result of this is that contact CR13—1 in line 262 opens the circuit direct to slide control solenoid 22A, but contact CR13—2 in line 303 to solenoid 22B closes because it is a normally closed contact, and since the relay CR12 has just been energized by the operation of limit switch LS9, it closes its contact CR12—2, thereby completing the circuit to solenoid 22B which shifts the valve 263, thereby reversing the pressure in cylinder 264, causing the slide to retract the work from the burners.

Relay CR12 also closes its contact CR12—1 in line 304 leading to relay CR9. Since relay CR5 is deenergized at this time its contact CR5—3 is normally closed, thereby setting up a circuit which is completed by the operation of limit switch LS4 which, as shown in Figure 2, is operated by a dog 305 carried by the slide member 26 and positioned to operate limit switch LS4 during the course of the return movement of the slide. When the limit switch is operated, it closes its contact LS4—1 and energizes relay CR9 which, in turn, closes its contact CR9—3, thereby latching in the circuit around the contact LS4—1.

It will now be seen that the control relay CR8 operates in response to work temperature, and everything waits until the work temperature has reached the desired degree. Then the relay CR8 operates either directly or through the timer relays, to extinguish the flames, empty the quenching mechanism, and cause it to be raised into position to grip the newly heated work piece. It also sets up a circuit for operation of the reversing valve 263 to cause return movement of the slide, but this circuit is not completed until the arms of the quenching mechanism have completed their elevating movement.

Continuation of the cycle then depends on the operation of limit switch LS9 by the elevating arms upon completion of their upward movement. Then, simultaneously, the work gripping rollers 218 engage the work, and the slide starts retracting the work from the burners.

As will be explained now, during the return movement of the slide, the one-tooth driving clutch is disengaged, and the work holding spindles are retracted, thereby freeing the work so that the quenching mechanism is its sole support, and so that at the end of the return movement, the quenching mechanism can be operated to quench the work.

Attention is invited to the fact that at the beginning of the slide return, it releases the limit switch LS3, thus opening its contact LS3—1 and deenergizing the timer relay TR10, which opens its contact TR10—1 in line 281 to the timer relays TR2 and TR3 which control the gas valves. It will be noted that in this circuit the operation is such that the closing of TR10—1 energizes the timer relays TR2 and TR3, but these relays are deenergized by the opening of the contact CR8—1.

The relay CR9 partially functions to recondition the circuit for the next cycle by opening its contact CR9—2 in line 294 to prevent any effect in the circuit by the closing of switch 293 in the thermopile when its temperature naturally falls due to extinguishing the heating flames. It also opens its normally closed contact CR9—1 in line 306 to prevent operation of timer relay TR6. Relay CR9 also reverses its connections to clutch solenoids 21A and 21B by opening its normally closed contact CR9—4 to solenoid 21A and closing its contact CR9—5 to solenoid 21—B, thereby energizing the latter to cause shifting of valve 258 into a position to disengage the one-tooth driving clutch 101. Although the disengagement of this clutch would normally stop rotation of the work it will be remembered that the work is not gripped in the driving rollers 210, 211 of the quenching mechanism which, as previously explained, are continuously driven by the motor 236.

The disengagement of the one tooth clutch 101 effected release of limit switch LS2 and operation of limit switch LS12. LS12 closes its contact in line 307, causing operation of relay CR25 near the top of Figure 15, which, in turn, closes its contact CR25—1 in the circuit 308 of index control relay CR3.

Also, during the return movement of the slide in the direction of arrow 309 in Figure 14, a trip finger 310 is engaged by a fixed tripping pawl 311 and rotated in a counterclockwise direction from its dotted line position to its full line position. The pawl 311 is pivotally mounted on a pin 312 secured in an upright 313 which is bolted to an angle plate 314 which, as shown in Figure 1, is fastened at 315 to the side wall of the machine.

The finger 310 is supported in a channeled member 316 which is secured to the drum 91 by a pair of bolts 317 and 318, which also serve as pivot pins for the finger 310, and a lever 319 which has a ball and socket connection at 320 with the finger 310. The lever 319 is also bifurcated at the end to engage a groove 321 in the end of the valve stem 322. This causes operation of the air valve 92 and thereby admission of pressure to the cylinder 79 shown in Figure 8 which, as previously explained, will cause retraction of the work supporting spindles 36 and 38.

Later on, when the manual control lever 93 is operated to clamp the next work piece in the fixture, the valve stem 322 will be moved in an opposite direction and thereby reset the position of the finger 310. In case there is any interference between the finger 310 and the tripping lever 311 during relative movement in the opposite direction, a spring 323 is attached to a bolt 324 that is connected to the end of the lever 311 to permit deflection thereof. It will now be seen that as the work fixture retracts from the burner, the end supports for the work piece are automatically retracted, and the one tooth clutch disengaged whereby the quenching fixture forms the sole support for the work piece.

When the work support members are retracted at station 40B, Figure 10, the bell crank 67, shown in Figure 8 for that station, is rotated in a clockwise direction, and this bell crank has a plunger 325 pivotally connected thereto at 326 and all during the heating cycle holds the plunger 325A engaged with crank 327A on end of actuating rod 327 as shown in Figures 1 and 10, which is operatively connected to a limit switch LS11 mounted on top of support 25, Figure 6. Therefore, the release of this limit switch by the movement of plunger 325A to the right as viewed in Figure 1 will cause the contact LS11—1 to close because it is a normally closed contact. This energizes relay CR6 which closes its contact CR6—2 in line 299 to quenching solenoid 23A but CR14—2 is held open.

On completion of the return stroke of the work support slide, limited by positive stop 277', Figure 6, a dog 330, shown in Figure 2, operates limit switch LS5 which closes its contact LS5—1 in line 331 to energize control relay CR5. The relay will close its contact CR5—1 in line 308 of the circuit to control relay CR3. It will also open its normally closed contact CR5—2 to deenergize control relay CR14. This relay will open its contact CR14—1 in the line 298 to solenoid 23A, thereby deenergizing this solenoid, and close its contact CR14—2 to solenoid 23B, whereby the work will be lowered into the quench tank. Relay CR5 also opens its contact CR5—3, thereby breaking the circuit to relay CR9.

Deenergization of relay CR9 results in the closing of its normally closed contacts CR9—1 in line 396, CR9—2 in line 294, and CR9—4 in line 257 and the opening of its other two contacts CR9—3 and CR9—5. This operation produces no important result at this time and simply amounts to resetting of these switches for future operation.

Limit switch LS6, shown in Figure 2, is operated by the work arms lowering the work piece into the quench tank, and closes its contact LS6—1 in line 308 leading to the indexing relay CR3. Operating in conjunction with the index relay CR3 is the index and preset control relay CR7. It will be noted that the circuit 308 to the index relay CR3 has an indexing start button 331 which the operator may use to start an indexing operation if all the other switches in the circuit are closed. However, a contact CR7—1 is connected in parallel with this button and is adapted to be closed by the relay CR7 if the operator desires to preset the circuit for automatic operation of the indexing mechanism when the conditions are such as to permit such operation. In order to understand this more clearly, the present condition of the indexible work support must be kept in mind.

The indexible carrier, as explained, has three stations, that is, a loading station, an idle station, and a heating station. At this particular point in the explanation of the cycle of operation, the heating station is empty. The idle station is loaded with a work piece, and a work piece was loaded into the carrier at the loading station prior to the start of this cycle. Therefore, at the time that the work piece was loaded at the loading station the operator decides whether to push the index and preset button 332 in circuit 333 leading to the index and preset control relay CR7. If he decided to operate the button at that time, the other switch contacts CR10—2 and CR4—2 in circuit 333 would be closed, and the relay CR7 would be energized, closing its latching contact CR7—2 located in parallel with the push button 332, thereby latching the circuit closed and permitting release of the push button 332.

This circuit would then remain latched all through the heating cycle just explained, and since the relay CR7 would also close its contact CR7—1 around the index button 331, the indexing operation would automatically start when all the necessary circuit conditions have been fulfilled. If the operator decided not to operate the push button 332, then when the time came for operation of the index mechanism, he would have to manually close the push button 331.

It will be noted that there are six different switches in the circuit 308 to the index relay CR3 and all of these switches must be closed before the indexing operation can be started. Taking these in order, it was explained that the contact LS6—1 was closed as a result of the heated work piece being moved into the quench tank by the quenching mechanism. The contact CR4—1 is closed as a result of the operation of relay CR4 by closed contact LS7—1 of limit switch LS7 which is held closed as shown in Figures 1, 6 and 8 by plunger 325 acting on crank 347 of rod 348 which is similarly connected at the other end by crank 349 for operation of switch LS7 as shown in Figures 1 and 10. Contact CR5—1 is closed by relay CR5 which is operated by limit switch LS5 as shown in Figure 2 when the work support returned to the front of the machine. Contact CR25—1 is closed due to the operation of Relay CR25 by limit switch LS12 which was operated by disengagement of the one tooth clutch as shown in Figure 7. Contact CR10—1 is closed by relay CR10 which is in the indexing circuit and which is normally maintained energized by limit switch LS—1 associated with the indexing mechanism as shown in Figure 6. Contact CR6—1 is closed due to the energization of relay CR6 by limit switch LS11 which was released when the work supporting members at the heating station were retracted to release the work piece for quenching. The last one of these six switches to close was LS6—1 which thereby completed the circuit to index relay CR3 when the heated work piece was moved into the quench tank.

*Indexing operation*

When the relay CR3 is energized, it closes its latching contact CR3—1 in line 334 which is connected to line 308 between contacts CR5—1 and CR25—1. At the same time the relay closes its contact CR3—2 and opens its normally closed contact CR3—3 in the indexing circuit and its normally closed contact CR3—6 in line 252 to the cycle relay CR1, releasing it. The index circuit is supplied with current from a rectifier, indicated generally by the reference numeral 335, which is connected by one line 336 to the A. C. line 249, and by a second line 337 to the A. C. line 250. Pulsating direct current is taken off of the rectifier by a pair of lines 338 and 339. A condenser 340 is connected across the output of the rectifier to smooth out the ripples in the current. Line 338 is connected through a contact LS1—2 of limit switch LS1, and a resistance 341 to relay CR10, the other side of the relay being connected by line 339 to the rectifier. It will be noted from Figure 6 that the limit switches LS1 and LS13 are held open by arms 342 and 343 respectively which are attached to shaft 114 which supports the indexing gear 193. This means that the normally closed contacts LS1—1 and LS13—1 are held open, thereby breaking the circuit to the clutch magnetizing coil 344. The brake magnetizing coil indicated by the reference numeral 345 is normally maintained energized by contact LS13—2, which is closed by limit switch LS13 during the heating operation, normally closed contact CR3—3, and contact CR25—3 which is closed due to the operation of limit switch LS12. Therefore, the operation of index relay CR3 opens the normally closed contact CR3—3, breaking the circuit to the brake coil 345, thereby releasing the brake of the indexing mechanism. It will be noted that a condenser 346 is connected across the brake coil and that a variable resistance 347 is connected in series with the coil. A by-pass switch CR10—3 is connected across the resistance and operable by relay CR10. Since during the heating operation relay CR10 is energized, the switch CR10—3 is closed and the full current is on the brake coil 345. At the same time the closure of contact CR3—2 sets up a circuit to the clutch coil 344 through line 348 and line 349, the contact CR25—2 being closed at this time. Thus, with clutch engaged and brake off, the worm gear 190' in Figure 6 starts to rotate worm 193 and shaft 114, moving arms 342 and 343 out of engagement with limit switches LS1 and LS13. This immediately causes closure of contacts LS1—1 and LS13—1 and opening of contact LS1—2. The opening of switch LS1—2 breaks the circuit to relay CR10, thereby closing its contact CR10—4 in parallel with the resistance 341, and opening the contact CR10—3 which is connected in parallel with the variable resistance 347 in series with the brake coil 345. Also, the operation of relay CR10 opens its contact CR10—2 in line 333 leading to the preset control relay CR7, breaking the circuit to that relay which, in turn, opens its latching contacts CR7—1 and CR7—2 which are connected in parallel with the push buttons 331 and 332.

After a complete revolution of the worm gear 193 the limit switch LS13 is again operated by arm 343, closing contact LS13—2 in the index circuit and opening contact LS13—1, thereby connecting the high resistance 347 in series with the clutch coil 345 to cause the clutch coil to effect a deceleration. This effects a slowing down of the rotation of the indexing mechanism and a slight additional movement will cause arm 342 to operate limit switch LS1, thereby closing its contact LS1—2, energizing relay CR10 which will close its contact CR10—3 and immediately allow a full flow of current into the brake coil 345 around the resistance 347 and lock the parts in that position.

The operation of the automatic index mechanism effects rotation of the work fixture through an angle of 120 degrees, and thus moves the work piece at the loading station to the idle station, and the work piece at the idle station to the heating station, thus leaving the loading station empty ready for the operator to load the next work piece.

Referring to Figure 10, as the drum starts indexing, pin 325A moves from a position opposite crank arm 327A of limit switch LS11 into a position opposite crank arm 347 of limit switch LS7. Since the pin is retracted at this moment, it produces no effect. However, the pin 325B is projected and as it moves into position opposite crank 327A, causes operation of limit switch LS11, opening its contact LS11—1 and deenergizing relay CR6 which is held deenergized throughout the next heating cycle. Simultaneously, pin 325 at the loading station moves to the idle station, releasing limit switch LS7, deenergizing relay CR4, and opening its contacts CR4—1 and CR4—2, the latter breaking the latching circuit to the preset index relay CR7. When the new work piece is loaded, the pin 325b will be projected and actuate limit switch LS7, so that LS7—1 is closed, reenergizing relay CR4, so that CR4—2 will be closed again, and the operator can reenergize the circuit by operation of the preset button 332 after the work is loaded and the new cycle started by operation of button 251.

When the indexing relay CR3 was energized to start the indexing operation, it closed another of its contacts CR3—4, thereby energizing timer relay TR6, which closed its latching contact TR6—2 in line 306, and time-closed contact TR6—3 in circuit to clutch solenoid 21A. When index is completed, CR10—5 will close, and when the operator completes loading the work and presses the cycle start button 251, contact CR1—5 will close and the next cycle will begin.

What is claimed is:

1. In a machine for flame hardening the pins of a crankshaft, said pins having an equal throw and arranged in predetermined angular phase relation, the combination of a bed having a slide, means to rotatably support a crankshaft on said slide, a plurality of bifurcated burners arranged on the bed parallel to said pins and providing elongated end slots for receiving the respective pins upon movement of the slide toward said burners, said burners being arranged in the same angular phase relation as said pins, means on the bed supporting said burners for movement in a circle having a radius equal to the throw of said pins, and power operable means for effecting joint rotation of said crankshaft and burners.

2. In a machine for flame hardening the pins of a crankshaft, said pins being arranged in predetermined angular phase relation about the axis of said shaft, the combination of means for receiving and heating said pins including a plurality of bifurcated burners arranged in the same phase relation as said pins about an axis parallel to the axis of the crankshaft, said burners having elongated end slots arranged in parallel relation to simultaneously receive the respective pins upon lateral movement of the shaft toward said burners, means on the bed supporting said burners for movement in a circle having a radius equal to the throw of said pins, and power operable means for effecting joint movement of the associated pairs of pins and burners about the axis of said shaft during heating of the pins.

3. In a machine for flame hardening the pins of a crankshaft, said pins being arranged in predetermined angular phase relation about the axis of said shaft, the combination of a heating mechanism including a plurality of bifurcated burners providing elongated end slots for receiving said pins upon movement of said shaft toward the burners, means supporting said burners for movement about an axis in a circle having a radius equal to the throw of said pins, means to position the crankshaft with its axis of rotation in juxtaposition to the axis of said circle, and power operable means for moving the shaft and burners about said axis in synchronism to effect heating of said pins.

4. In a machine for flame hardening the pins of crankshafts, the combination of a bed having a slide mounted thereon, an indexable work carrier mounted on the slide for supporting a plurality of crankshafts, a heating mechanism mounted on the bed, power operable means to move the slide to and from said heating mechanism, said indexable carrier having a plurality of stations, headstock and tailstock members at each station, power operable means for moving said members toward and from each other to engage opposite ends of a work piece including a manually operable control valve for each station to effect clamping of the work, a trip member mounted on the bed, and trip actuable means operatively connected with each valve and successively positionable by said indexable carrier for engagement by said trip member during return movement of said slide.

5. In a machine for flame hardening the pins of crankshafts, the combination of a bed having a slide mounted thereon, an indexable carrier mounted on the slide having a plurality of work supporting stations, fluid operable means at each station for engaging the ends of a crankshaft including a control valve, manually operable means for actuating one of said valves to clamp the work piece at a loading station, means to index said carrier to move the work to a heating station, a heating mechanism mounted on said bed, power operable means for advancing said slide to move the work piece at the heating station into heating relation with said heating mechanism, means to reverse said power operable means to cause retraction of the slide, and means trip operable by the retracting slide to automatically actuate the control valve at the heating station to release a work piece.

6. In a machine for flame hardening work, the combination of a bed having a slide mounted thereon, an indexable carrier mounted on the slide having a plurality of stations including a loading station and a heating station, power operable means for indexing said carrier including a starting control circuit having a starting switch, means in said circuit including a first switch responsive to a loaded condition at the loading station, a second switch responsive to a loaded condition at the heating station, said switches being operatively connected to the circuit and effective only in response to a loaded condition at the loading station and an unloaded condition at the heating station to render said starting switch effective to start indexing.

7. In a machine for flame hardening the pins of crankshafts, the combination of a bed having a slide mounted thereon, an indexible carrier mounted on the slide having a plurality of stations including a loading station and a heating station, means on the carrier at each station for rotatably supporting a work piece, a heating mechanism mounted on the bed having individual burners for the respective pins to be heated, a work driving clutch mounted on the slide opposite the heating station of the indexible carrier, power operable means for operatively connecting the driving clutch with the work piece at the heating station to effect rotation thereof, and means subsequently operable to advance the slide toward the heating mechanism.

8. In a machine for heat treating shafts and the like, the combination of a bed having a heating mechanism thereon, a work supporting slide mounted on the bed for movement to and from said heating mechanism, power operable means for moving the slide including a reversing means, means in the heating mechanism automatically responsive to the temperature of the work for actuating said reversing means to cause retraction of the slide, a quench tank formed in the bed below said slide, and means on the slide trip operable upon completion of retraction of the slide for moving the heated work piece from the slide into the quench tank.

9. In a machine for heat treating shafts and the like, the combination of a bed having a heating mechanism thereon, a work supporting slide movably mounted on the bed for movement to and from said heating mechanism, power operable means carried by the slide for rotating the work piece during slide movement, a clutch for operatively connecting said power operable means to the work piece, power operable means for moving the slide including a reversing means, temperature control means in the heating mechanism automatically operable to actuate said reversing means to effect retraction of the slide, means responsive to return movement of the slide to disengage said clutch, and sequentially operable means for removing the heated work piece from the slide and quenching the same.

10. In a machine for heat treating shafts and the like, the combination of a bed having a heating mechanism thereon, a slide movable on the bed to and from said heating mechanism, power operable means for effecting said movement including reversing means, an indexible work support mounted on said slide for positioning a work piece for heating, temperature control means in the heating mechanism responsive to the temperature of the work for automatically actuating said reversing mechanism to cause retraction of the slide, trip means operable in response to return movement of the slide for removing the heated work piece from the indexible support, and means responsive to removal of the work for automatically effecting indexing of the support.

11. In a machine for heat treating shafts and the like, the combination of a bed having a heating mechanism thereon, a slide movably mounted on the bed to and from a heating mechanism, an indexible work support mounted on said slide having a plurality of work supporting stations, a power operable indexing mechanism carried by the slide including a constantly rotating shaft, a driven shaft operatively connected for rotating said support, an electric clutch for coupling said shafts, and an electric brake automatically operable upon deenergization of said clutch for stopping said indexible support.

12. In a machine for heat treating shafts and the like, the combination of a bed having a heat treating mechanism thereon, a work supporting slide movable on the bed to and from said heating mechanism, a pair of work supporting members carried by the slide for terminally engaging and supporting a work piece for rotation during the heat operation, said heating mechanism having work temperature control means automatically responsive to the temperature of the work for causing retraction of the work supporting members, and means carried by the slide for supporting the work piece after retraction of the work supporting members, said means being effective upon retraction of the slide to effect quenching of the work.

13. In a flame hardening machine for heat treating the crankpin of a rotatable crankshaft, the combination of a bifurcated burner for heating the pin, means supporting said burner for rotary movement for a circular path having a throw equal to the throw of said pin, a continuously driven shaft connected for driving said burner, a one tooth clutch continuously driven by said shaft, a work driver having terminal work engaging means shaped to engage co-acting shaped means on the end of the crankshaft in only one rotatable position thereof, detent means to determine the rotary position of the work driver during loading to position the crankpin in phase with said burner, and means to connect said work driver with said one tooth clutch to effect synchronous rotation of the burner and crankshaft.

14. In a flame hardening machine for heat treating the crankpin of a rotatable crankshaft, the combination of a bifurcated burner for heating the pin, means supporting said burner for rotary movement in a circular path having a throw equal to the throw of said pin, a continuously driven shaft connected for driving said burner, a one tooth clutch continuously driven by said shaft, a work driver having terminal work engaging means shaped to engage co-acting shaped means on the end of the crankshaft in only one rotatable position thereof, detent means to determine the rotary position of the work driver during loading to position the crankpin in phase with said burner, means to connect said work driver with said one tooth clutch to effect synchronous rotation of the burner and crankshaft, and means to shift the crankshaft to and from the burner to effect insertion and withdrawal of the pin with respect to the burner during continuous movement of each.

15. In a flame hardening machine for heat treating the crankpin of a rotatable crankshaft, the combnation of a bifurcated burner for heating the pin, means supporting said burner for rotary movement for a circular path having a throw equal to the throw of said pin, a continuously driven shaft connected for driving said burner, a one tooth clutch continuously driven by said shaft, a work driver having terminal work engaging means shaped to engage co-acting shaped means on the end of the crankshaft in only one rotatable position thereof, detent means to determine the rotary position of the work driver during loading to position the crankpin in phase with said burner, means to connect said work driver with said one tooth clutch to effect synchronous rotation of the burner and crankshaft, and power operable means to shift the crankshaft to and from the burner during continuous movement of each.

16. In a flame hardening machine for heat treating the crankpin of a rotatable crankshaft, the combination of a bifurcated burner for heating the pin, means supporting said burner for rotary movement for a circular path having a throw equal to the throw of said pin, a continuously driven shaft connected for driving said burner, a one tooth clutch continuously driven by said shaft, a work driver having terminal work engaging means shaped to engage co-acting shaped means on the end of the crankshaft in only one rotatable position thereof, detent means to determine the rotary position of the work driver during loading to position the crankpin in phase with said burner, means to connect said work driver with said one tooth clutch to effect synchronous rotation of the burner and crankshaft, power operable means to shift the crankshaft to and from the burner during continuous movement of each, and means responsive to engagement of said one tooth clutch to effect actuation of said power operable means.

ERWIN G. ROEHM.

References Cited in the file of this patent
UNITED STATES PATENTS

| Number | Name | Date |
|---|---|---|
| 2,261,624 | Inskeep | Nov. 4, 1941 |